United States Patent [19]

Adachi et al.

[11] Patent Number: 5,172,590
[45] Date of Patent: Dec. 22, 1992

[54] APPARATUS FOR MEASURING THE GROUND CONTACTING PORTION OF TIRE TREAD

[75] Inventors: Zempachiro Adachi; Yoshio Gouhara, both of Hiratsuka, Japan

[73] Assignee: The Yokohama Rubber Co., Ltd., Tokyo, Japan

[21] Appl. No.: 733,777

[22] Filed: Jul. 22, 1991

[30] Foreign Application Priority Data

Aug. 24, 1990 [JP] Japan .................................. 2-221046

[51] Int. Cl.$^5$ ........................................ G01M 17/02
[52] U.S. Cl. .................... 73/146; 250/227.11
[58] Field of Search .................. 73/146, 8; 356/71; 250/227.11

[56] References Cited

U.S. PATENT DOCUMENTS 5,088,321 2/1992 Kajikawa et al. ...................... 73/146
5,092,166 3/1992 Wada et al. ........................... 73/146

*Primary Examiner*—Donald O. Woodiel
*Attorney, Agent, or Firm*—Nikaido, Marmelstein, Murray & Oram

[57] ABSTRACT

An illuminating device is arranged along the side edges of a glass plate to illuminate the interior of the glass plate. The tire tread is pressed against one of surfaces of the glass plate. A camera is used to photograph from the other surface of the glass plate the ground-contacting geometry of the tire tread in contact with the glass plate. The illuminating device consists of condenser lenses facing the side edges of the glass plate, a light source and optical fiber cables connecting the converging lenses with the light source.

6 Claims, 4 Drawing Sheets

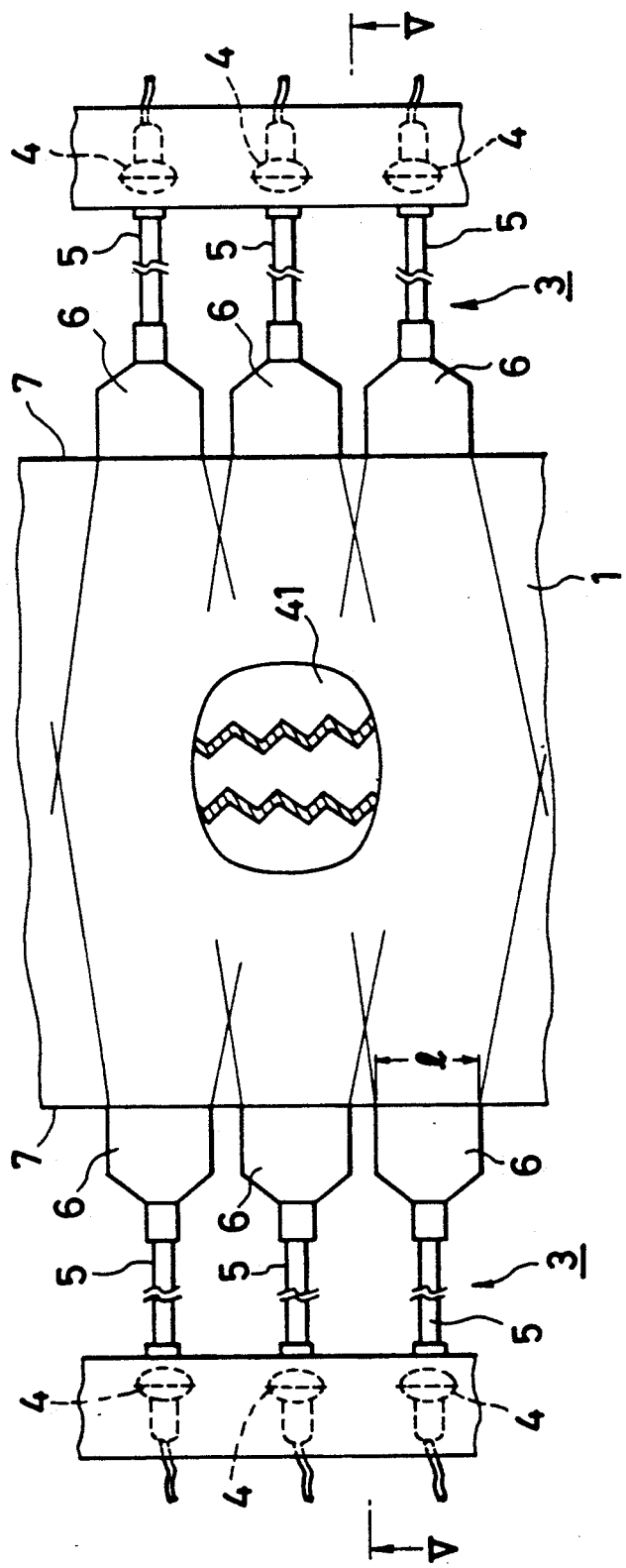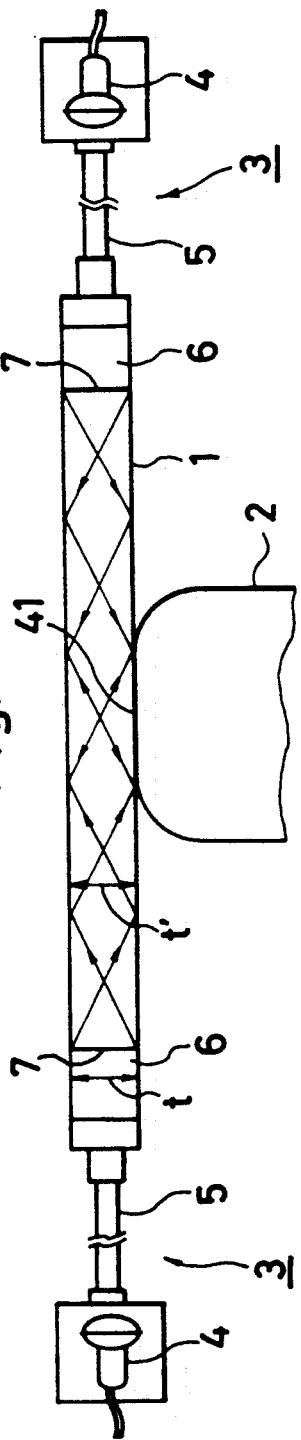

APPARATUS FOR MEASURING THE GROUND CONTACTING PORTION OF TIRE TREAD

BACKGROUND OF THE INVENTION

The present invention relates to an apparatus for measuring the ground-contacting portion of tire tread and more specifically to a tire tread's ground-contacting portion measuring apparatus which measures with high precision the contact section of the tire tread pressed against a glass plate.

As an apparatus for observing or measuring the geometry of tire tread in contact with the ground, a device is known in which an illuminating device is arranged by the side of the glass plate edge and the tire is pressed against one of the surfaces of the glass plate to photograph the contacting geometry of the tire tread from the opposite surface of the glass plate by a camera.

With the above-mentioned tire-tread measuring apparatus, however, since the illuminating device is positioned close to the side edges of the glass plate, the heat from the illuminating device may deform the glass plate and, in the case of a laminated glass, may cause exfoliation at the joint. As a result, the picture image has nonuniform spots, making the high precision measurement of the tire-tread contact geometry difficult.

To solve this problem, it has been conceived to provide a cooling device to the illuminating device. Even this method can hardly maintain a stable measuring accuracy at all times and is disadvantageous in terms of cost.

SUMMARY OF THE INVENTION

An object of this invention is to provide an apparatus for measuring the ground-contacting portion of a tire tread which keeps the glass plate or laminated glass plate from being deformed or exfoliated by the heat of the illuminating device and thereby assures high precision measurement.

That is, a tire tread's ground-contacting portion measuring apparatus according to this invention comprises: a glass plate; an illuminating device arranged along the side edges of the glass plate to throw rays of light into the glass plate; a tire having its tread pressed against one of surfaces of the glass plate; and a camera to photograph from the other surface of the glass plate the ground-contacting geometry of the tire tread in contact with the glass plate; said illuminating device including condenser lenses facing the side edges of the glass plate, a light source and optical fiber cables connecting the condenser lenses with the light source.

The illuminating device is constructed by using the condenser lenses and optical fiber cables to allow the light source, also a source of heat, to be located away from the glass plate, thus protecting the glass plate from the effect of heat. Since the glass plate is not heated by the light source, it can be kept from being deformed. Or in the case of a laminated glass plate, exfoliation at the joint can be prevented.

The surfaces of the condenser lenses facing the side edges of the glass plate are formed rectangular and their shorter side or thickness of the lens surface is preferably made virtually equal to that of the glass plate.

A large number of the condenser lenses are preferably arranged along the side edges of the glass plate.

The optical fiber cables are each made up, preferably, of a large number of optical fibers bundled together.

The light source is preferably a halogen lamp.

Further, the tire and the camera are preferably made to move synchronized and parallel with each other in a direction parallel to the surface of the glass plate.

BRIEF DESCRIPTION OF THE DRAWINGS

FIG. 4 is a plan view showing an essential portion of the tire-tread ground-contacting portion measuring apparatus of the invention; and FIG. 5 is a cross section taken along the line V—V of FIG. 4.

DESCRIPTION OF THE PREFERRED EMBODIMENTS

Now, one embodiment of this invention will be described by referring to the attached drawings.

Figure 2:
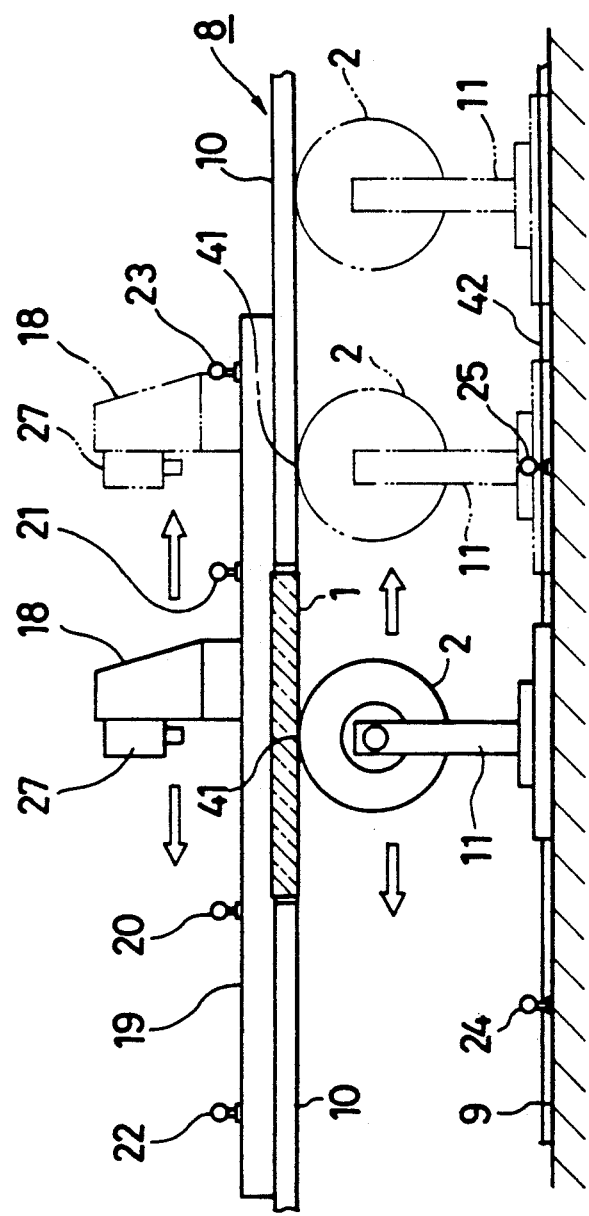
FIGS. 2 and 3 are schematic views showing the operating principle of the tire-tread ground-contacting portion measuring apparatus of the invention.
Figure 3:
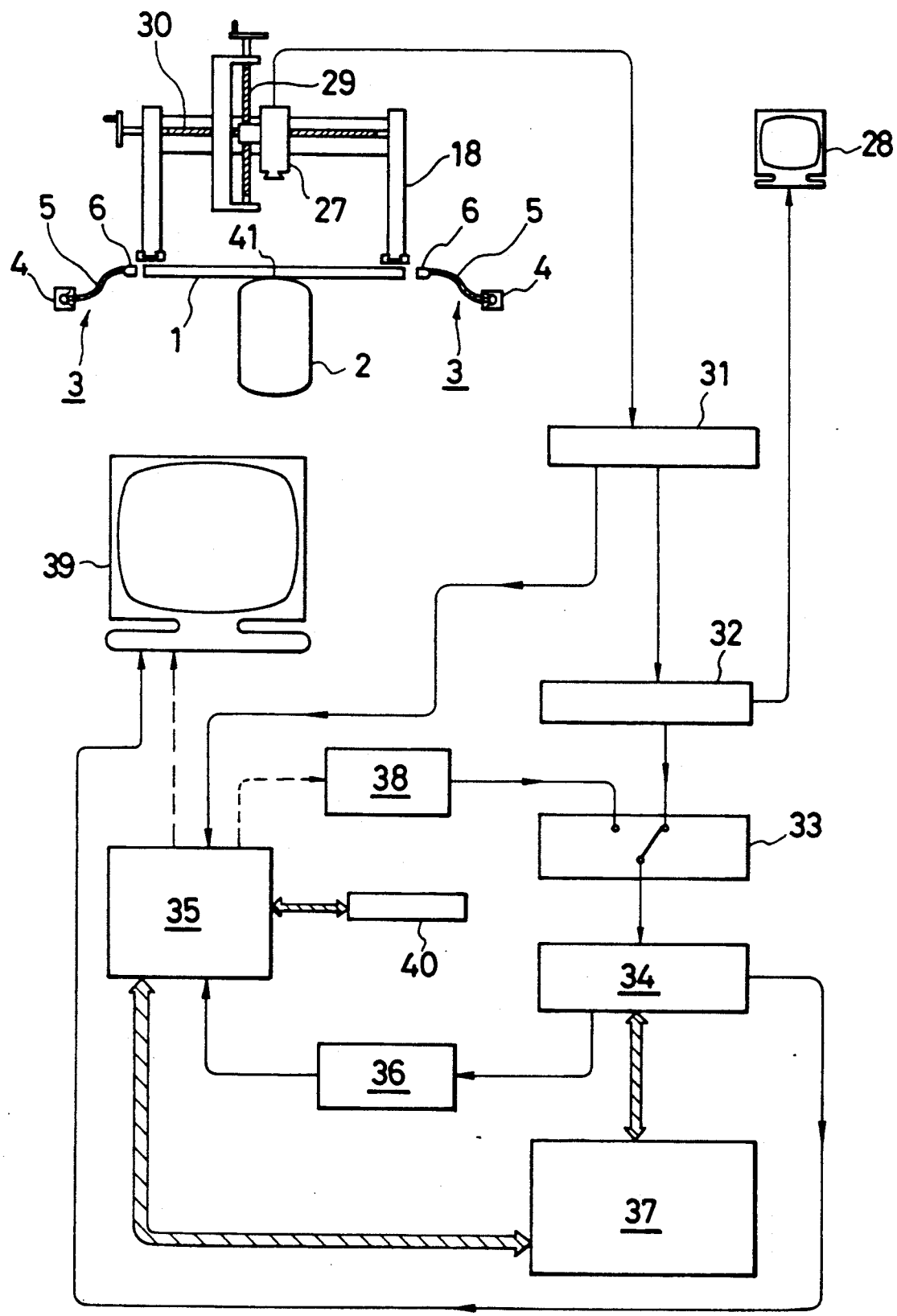

FIGS. 2 and 3 show the operating principle of this invention. In FIG. 2, reference numeral 1 represents a glass plate formed of a reinforced transparent glass. The glass plate 1 is formed into a rectangular shape with a specified thickness. The tread of a tire 2 is pressed against the undersurface of the glass plate 1 and moved parallel to it so that the tire rotates on the underside of the glass plate 1. As shown in FIG. 3, illuminating devices 3 are installed along the opposing sides of the glass plate 1 so that light can be shed from the sides into the interior of the glass plate 1. Over the upper surface of the glass plate 1 is arranged a camera 27 that takes a picture of the ground-contacting tread geometry of the tire 2 that is in contact with the glass plate 1. The camera 27 is installed in such a manner as to move parallel with and in synchronism with the tire 2, with the center of the camera's view aligned with the central part of the ground-contacting tread area of the tire.

The camera 27 on the upper side of the glass plate 1 travels with a camera mount 18 only in a limited region covering the glass plate 1. The tire 2 on the bottom side of the glass plate 1 is made to move back and forth together with a tire mount 11 over a longer distance than does the camera 27. Because of this, as shown in FIG. 2, to make the camera 27 synchronize with the tire 2, a left-side finish limit switch 20 and a right-side finish limit switch 21 are provided on a frame 19—on which the camera mount 18 is mounted—on the right and left side of the glass plate 1. Further outward from these limit switches there are left-end and right-end limit switches 22, 23 on the frame 19. On a floor 9 are provided a left-side start limit switch 24 that corresponds to the left-end limit switch 22 and a right-side start limit switch 25 that corresponds to the right-end limit switch 23. These start limit switches cause the camera mount 18 to move in synchronism with the tire mount 11 at the same speed and in the same direction. The synchronization control between the camera mount 18 and the tire mount 11 is carried out by a synchronous/asynchronous selector switch (not shown).

As shown in FIG. 3, the camera 27 mounted on the camera mount 18 can be positioned in vertical and lateral (widthwise of the mount) directions manually in advance. The positioning of the camera 27 is done by watching the image of the tire's ground-contacting portion shown on a camera adjust monitor 28 and manually turning a vertical threaded shaft 29 or lateral threaded shaft 30 mounted on the camera mount 18. The camera 27 may employ an industrial television camera that has 527 scanning lines and is able to photograph one frame every 0.2 seconds. The time intervals between the frames can be changed arbitrarily according to the length of the contact area of the tire tread.

The picture of the ground-contacting tread portion shot by the camera 27 is fed through a camera controller 31, a video signal distributor 32 and a video camera selector 33 and into a video tape recorder 34 where it is recorded. With the video camera selector 33 switched to an image processor 35, the image of the ground-contacting tread portion stored in the video tape recorder 34 is supplied through a time base collector 36 to the image processor 35, where it is processed according to commands from a personal computer 37 for analysis of pressure distribution over the ground-contacting tread area. Then, the image processor assigns different colors to the different pressures and a color encoder 38 coverts the color-differentiated image into a video signal which is recorded in the video tape recorder 34. If necessary, the tire tread pressure distribution image, which is colored according to the ground-contacting pressure, is shown on a color monitor 39. At the same time, the image of the ground-contacting tread of the tire is also displayed on the camera adjust monitor 28 via the camera controller 31 and the video signal distributor 32. Denoted 40 is a digitizer.

In the foregoing configuration, the image of the ground-contacting tread photographed by the camera 27 is temporarily recorded in the video tape recorder 34 before being fed to the image processor 35. To improve the picture quality, however, the tread image from the camera 27 may be sent directly to the image processor 35 bypassing the video tape recorder 34.

The illuminating device 3, as shown in FIGS. cables 5 each made up of several tens to hundreds of optical fibers bundled together, and condenser lenses 6 whose light-throwing surfaces facing the side edges of the glass plate 1 are rectangular and their short side or thickness t is virtually equal to the thickness t' of the glass plate 1. As shown in FIG. 4, there are a large number of converging lenses 6 arranged parallel to and facing the surfaces 7 of the side edges of the glass plate 1 and put as close to each other as possible. In this arrangement, light emitted from the halogen lamps 4 is transmitted through the optical fiber cables 5 to the condenser lenses 6, which radiate parallel rays of light into the glass plate 1 so that the inside of the glass plate 1 is illuminated uniformly. Reference symbol l in the figure indicates the length of the longer side of the light converging lens 6.

The halogen lamp 4 as a light source is not positioned directly by the side of the glass plate 1 but is located remote from it by using the optical fiber cable 5. This arrangement prevents the glass plate 1 from being distorted or the laminated glass from being exfoliated at the joint by the heat of the halogen lamp 4. Thus, the ground-contacting geometry of the tire tread photographed by the camera 27 or the ground-contacting pressure distribution is not distorted, permitting a highly precise measurement.

Since a plurality of condenser lenses 6 whose thickness t is equal to the thickness t' of the glass plate 1 are arranged parallel to the side edges of the glass plate 1, the rays of light from the halogen lamp 4 can be shed uniformly into the glass plate 1, making the brightness in the whole interior of the glass plate 1 uniform.

Figure 1:
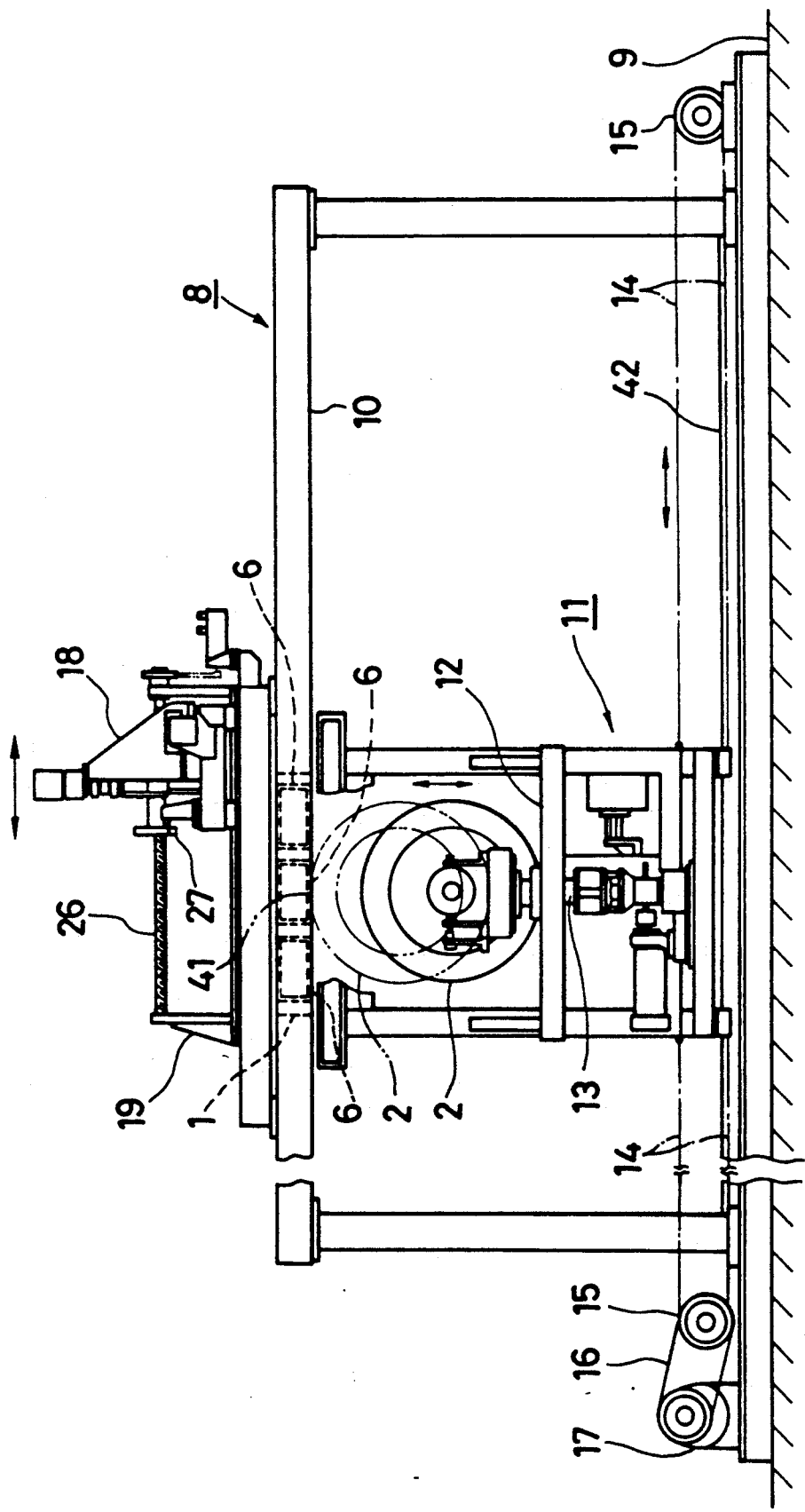
FIG. 1 is a front view of the tire-tread ground-contacting portion measuring apparatus of this invention.

FIG. 1 shows an apparatus that embodies the aforementioned principle of this invention.

Designated 8 is a stand installed on the floor 9. The glass plate 1 and the illuminating device (not shown) are mounted at the central portion of a top plate 10 of the stand 8. The undersides of the top plate 10 and the glass plate 1 are made flush with each other so that the tire movement from the top plate 10 onto the glass plate 1 will not cause a change in the ground-contacting pressure of the tire 2. On the floor 9 facing the top plate 10, there are laid two rails 42 running parallel to the stand 8 on which the tire mount 11 travels. Mounted vertically movable on the tire mount 11 is a tire mounting portion 12, on which the tire 2 is rotatably mounted. The tire mounting portion 12 has a threaded shaft 13 screwed vertically therethrough, which is erected on the tire mount 11. By rotating the threaded shaft 13 in a desired direction, it is possible to raise the tire mounting portion 12 along the tire mount 11 to press the tire 2 against the top plate 10 with a specified load. The tire mount 11 is connected with an endless toothed belt 14, which is wound on a pair of toothed pulleys 15. One of the toothed pulleys 15 is driven by a forward/reverse rotation motor 17 through a toothed belt 16 to move the tire mount 11 in the right or left direction. The tire 2 rotatably mounted on the tire mount 11 now moves rotating on the undersides of the top plate 10 and the glass plate 1 with the tread pressed against them with a specified load.

On the stand 8 is mounted the camera mount 18 that moves longitudinally along the stand 8 in synchronism with the tire mount 11. The frame 19 secured to the stand 8 has a threaded shaft 26 that screws through the camera mount 18. Hence, by turning the threaded shaft 26, the camera mount 18 can be moved longitudinally along the stand 8 at the same speed as the tire mount 11.

The measuring apparatus with the above construction is installed indoors where external light can be shielded.

Next, the operation of the above-mentioned measuring device will be explained.

First, when the illuminating device 3 is turned on, the rays of light from the halogen lamps 4 are transmitted through the optical fiber cables 5 to the condenser lenses 6 that turns them into parallel rays, which are introduced via opposite sides of the glass plate 1 into the glass plate interior, as shown in FIG. 5. The tire mount 11 and the camera mount 18 are retracted to the right side of the stand 8, as shown in FIG. 2 (home positioning).

Then, the motor 17 for driving the tire mount 11 is turned on to move the tire mount 11 from the right end of the stand 8 toward the left end. When the tire mount 11 turns on the right-side start limit switch 25, the camera mount 18 starts to move toward the left side of the stand 8 at the same speed as the ground-contacting tread of the tire 2 that is rolling pressed against the glass plate 1, the camera 27 on the camera mount 18 takes a picture of the ground-contacting portion 41 of the tire tread at the rate of one frame per 0.2 seconds. The picture of the tread's ground-contacting portion 41 photographed by the camera 27 is temporarily stored in the video tape recorder 34. The image of the tread's ground-contacting portion 41 recorded by the video tape recorder 34, as described earlier, is processed by the image processor 35 an displayed on the color monitor 39.

When the camera mount 18 turns on the left-side finish limit switch 20, both the camera mount 18 and the tire mount 11 stop. Then, the camera mount 18 and the tire mount 11 are retracted to the right side of the stand 8 where they are home-positioned.

As the tire mount 11 and the camera mount 18 move together, with the tire 2 pressed against the top plate 10 at a specified load, the parallel light rays, after entering the glass plate 11, are deflected and have angles with the upper and lower surfaces of the glass plate 1. The angle of rays is less than the critical angle where the tread of the tire 2 is not in contact with the underside of the glass plate 1 and thus the light is totally reflected to produce a dark image. Where the tread contacts the underside of the glass plate 1, the light is absorbed, producing a bright (white) image of the ground-contacting portion 41. In this case, the brightness of the ground-contacting portion changes according to the magnitude of contact pressure, so that it is possible to process the image by the image processor 35 and represent the contact pressure distribution of the tire's ground-contacting portion 41 in different colors on the display.

Since the tire mount 11 and the camera mount 18 move together, the picture of the ground-contacting portion 41 of the tire tread can be taken without any blur as if the ground-contacting portion 41 were stationary.

What is claimed is:

1. A tire tread's ground-contacting portion measuring apparatus comprising:
    a glass plate;
    an illuminating device arranged along the side edges of the glass plate to throw rays of light into the glass plate;
    a tire having its tread pressed against one of surfaces of the glass plate; and
    a camera to photograph from the other surface of the glass plate the ground-contacting geometry of the tire tread in contact with the glass plate;
    said illuminating device including condenser lenses facing the side edges of the glass plate, a light source and optical fiber cables connecting the condenser lenses with the light source.

2. A tire tread's ground-contacting portion measuring apparatus as claimed in claim 1, wherein the surfaces of the condenser lenses facing the side edges of the glass plate are formed rectangular and their shorter side or thickness of the lens surface is virtually the same as that of the glass plate.

3. A tire tread's ground-contacting portion measuring apparatus as claimed in claim 2, wherein a large number of the condenser lenses are arranged along the side edges of the glass plate.

4. A tire tread's ground-contacting portion measuring apparatus as claimed in claim 1, wherein the optical fiber cables are each made up of a large number of optical fibers bundled together.

5. A tire tread's ground-contacting portion measuring apparatus as claimed in claim 1, wherein the light source is a halogen lamp.

6. A tire tread's ground-contacting portion measuring apparatus as claimed in claim 1, wherein the tire and the camera are made to move parallel in synchronism with each other in a direction parallel to the surface of the glass plate.

* * * * *